United States Patent [19]

Allaire et al.

[11] Patent Number: 5,177,039
[45] Date of Patent: Jan. 5, 1993

[54] METHOD FOR MAKING CERAMIC MATRIX COMPOSITES

[75] Inventors: Roger A. Allaire, Big Flats; Victor F. Janas, Horseheads, both of N.Y.

[73] Assignee: Corning Incorporated, Corning, N.Y.

[21] Appl. No.: 623,075

[22] Filed: Dec. 6, 1990

[51] Int. Cl.⁵ .............................................. C03C 14/00
[52] U.S. Cl. ........................................ 501/95; 501/32; 65/18.1; 65/18.4; 428/368; 428/902; 264/122
[58] Field of Search .................... 501/32, 95; 65/18.4, 65/18.1; 428/368, 902; 264/122

[56] References Cited

U.S. PATENT DOCUMENTS 4,412,854  11/1983  Layden ................................ 65/18.1
4,921,518   5/1990  Allaire et al. ...................... 65/60.5
4,992,127   3/1990  Kishi .

Primary Examiner—William R. Dixon, Jr.
Assistant Examiner—C. Melissa Bonner
Attorney, Agent, or Firm—Kees van der Sterre

[57] ABSTRACT

Fiber-reinforced ceramic matrix composite articles of complex shape are made with improved physical integrity and control over fiber alignment by a process wherein prepreg comprising fibers and powdered matrix is treated to shorten the average length of the fibers, then configured without binder removal into a preform of selected shape and fiber orientation, and finally consolidated with heat and pressure into a dense ceramic matrix composite article. Fiber breakage during the consolidation process is thereby avoided.

12 Claims, 2 Drawing Sheets

METHOD FOR MAKING CERAMIC MATRIX COMPOSITES

BACKGROUND OF THE INVENTION

The present invention relates to ceramic matrix composites, and more particularly to fiber-reinforced ceramic matrix composites comprising short reinforcing fibers, wherein the alignment of the fibers can be controlled to control the physical properties of the composite product.

At the present time, many glass, glass-ceramic, and ceramic matrix composites are formed from unconsolidated material known as prepreg. Prepreg consists of an assemblage of reinforcing fibers which has been impregnated with a selected matrix material in particulate form, typically as a glass or crystalline ceramic powder. Also present in the prepreg is a binder, usually an organic polymer, which holds the powdered ceramic material and fibers together.

U.S. Pat. No. 4,615,987 discloses conventional methods for the manufacture of ceramic matrix composites, and describes the preparation of individual tow prepreg and sheet prepreg. Sheet prepreg as currently produced contains continuous fiber tows in three forms: as parallel tows, as parallel tows in combination with individual whiskers (known as "hybrid" prepreg), or as two-dimensionally woven or braided cloths.

Prepreg in the form of simple sheet is typically formed by drum-winding continuous impregnated fiber tow or yarn. Prepreg tape can be made by collimating and consolidating multiple continuous tows into a continuous ribbon.

Since prepreg is typically formed of long or continuous fibers or fiber tows which are directionally aligned, either along a single axis or along a few selected axes in a plane, the ceramic composite products formed from prepreg tow inherently have anisotropic (directionally dependent) properties. Uniaxial fiber alignment (all fibers aligned in a common direction) produces composite bars or beams with a single strong axis, while planar fiber arrays (fibers lying flat but in random directions within a flat or curved plane) produce curved or flat sheet with high stiffness and strength in the plane of the fibers.

Composites of complex three-dimensional shape, when made by casting or molding processes, typically comprise shorter, randomly oriented reinforcing fibers and have no preferred strong axis or plane. In many cases the randomly oriented reinforcing fiber phase, and the resulting isotropic strength properties, are deemed desirable. However, this is not always the case.

In U.S. Pat. No. 4,921,518, a process for making a short-fiber composite is described wherein long reinforcing fibers are combined with a glass matrix material, heated to soften the glass, and then chopped to form a partially consolidated pre-product which is shaped by hot glass forming methods into a composite product. In another approach, the combined fiber and matrix material are first chopped to form an unconsolidated glass/short-fiber mixture, and the mixture thereafter subjected to binder burnout and hot-pressing to form the final product.

U.S. Pat. No. 4,511,663 describes a method for ceramic matrix composite manufacture wherein metal-coated fibers are combined with powdered glass to form a prepreg which is cut into pieces, stacked in a mold, and hot-pressed to a final product. In U.S. Pat. No. 4,780,432, composites are made by a glass injection molding process at high temperatures and pressures.

In the field of polymers, it is known to use shortened glass and carbon fibers to reinforce resin matrix materials. U.S. Pat. Nos. 4,856,146, 4,856,147, and 4,857,385, for example, describe the production of so-called stretch-broken fiber yarn for composite reinforcement. The process involves first coating the yarn with a viscous coating, then stretch-breaking individual fibers, and finally incorporating the coated, stretch-broken yarn into the matrix polymer. Unfortunately, viscous-coating and then stretch-breaking fibers is incompatible with conventional ceramic composite fabrication technology, which requires the removal of all sizing and other organics from the fibers prior to coating or infiltration with ceramic matrix materials.

Whereas the use of shorter fibers for complex ceramic shape-forming is advantageous from a processing standpoint, short fibers do not always provide the physical properties required in the final product. Thus, as previously suggested, it is difficult to achieve fiber alignment and high strength along a preselected axis or plane in a complex shape made from conventional short-fiber prepreg materials, since fiber orientation in the latter is typically random. Yet there are many instances where the presence of a strong axis or plane in a complex shape would be of considerable value.

The difficulties in incorporating long, directionally aligned fiber reinforcement in ceramic matrix composites of complex shape are substantial. Conventionally, the volume proportion of void space in ceramic matrix composite preforms following the burnout of all organic binder constituents is in the range of 75 to 80 volume percent. This means that the burned-out preform must debulk by a factor of 3 to 5 during consolidation, in order that a dense composite can be obtained.

Debulking is not a problem when the composites being consolidated have simple flat plate geometries requiring little fiber movement in directions parallel to the fibers. With complex shapes, however, and where long, continuous fibers are present, debulking requires a realignment of preform structure through ply slippage. This interply motion results in either fiber buckling in compression, or fiber breakage in tension, in order that full consolidation can be achieved. And, where the fibers are sufficiently strong that they cannot be broken or buckled, significant void retention in the composite product can be expected. In either case, a weakened product results.

SUMMARY OF THE INVENTION

The present invention provides a manufacturing process for complex composite shape forming wherein shortened fibers are used, but wherein the degree of fiber alignment along a preselected axis or within a preselected plane may be closely controlled. Thus the fibers in the composite can be uniaxially aligned to produce a strong axis in the shaped product, aligned parallel with a common direction in a straight or curved plane to provide high planar stiffness and strength in a particular direction, or else randomly aligned in a selected plane to provide multi-axial transverse stiffness and strength.

The initial step in the process is to produce a composite prepreg comprising a powder of a ceramic matrix material, an organic binder, and multiple directionally aligned, long-staple inorganic reinforcing fibers. By long-staple inorganic fibers is meant fibers having average lengths measured in tens of centimeters, more typically in meters. Such fibers comprise the major constituent of commercially available fiber tows, yarns, or tapes.

The prepreg thus provided, wherein the reinforcing fibers are highly aligned, is next treated in prepreg form to induce breakage or shortening of at least some and preferably the majority of the long-staple fibers present therein. The product of this treatment can be either continuous shortened-fiber prepreg, or instead discontinuous chopped or "flaked" shortened-fiber prepreg. In the former case, the continuous prepreg retains the directionally aligned fiber arrangement of the starting prepreg. In the latter case, the flakes can be randomly oriented, but each flake retains a domain of aligned fibers.

The shortened fiber prepreg thus provided is next shaped, at a temperature below the binder burnout temperature thereof, into a preform shape. The shape has the configuration selected for the composite product, and shaping is carried out such that alignment of the shortened fibers in the preform is controlled. Using the appropriate continuous or shaped prepreg, fiber alignment can be in any direction desired for the selected end use of the product. Thus, continuous tow can be wound to provide fiber alignment parallel to one or multiple straight or curved axes lying in a flat, curved, or closed curved plane or surface of the preform. Alternatively, random fiber alignment in a flat or curved plane can be achieved by the pressing of flaked prepreg into a preform of the desired flat or curved shape.

Finally, the preform shape thus provided is subjected to debindering and consolidation steps to expel the binders and convert the shape to a dense ceramic matrix composite material. The shape may be consolidated alone or in combination with other prepreg materials or shapes, in order to form a final product of the desired complex configuration.

The process of the invention as above described offers a number of advantages over prior art methods for making composite products of complex shape. First, arbitrary shapes can readily be provided, with convenient control over the direction of fiber alignment in the preform. The shaping of preforms of near-final selected product configuration is significantly aided by carrying out the shaping at temperatures below the binder burnout temperature, where the thermoplastic characteristics of the binder can facilitate fiber and binder realignment as required for shaping, and at the same time help to fix the preselected preform shape during the interval prior to preform consolidation.

The shortened fiber dimensions in the prepreg not only simplify preform shaping, but also permit the necessary movement of the fibers in directions parallel with their length during consolidation. As previously noted, the reduction of fiber buckling as well as the avoidance and/or control of fiber breakage during debulking and consolidation are critically important in achieving full consolidation and high strength in the consolidated product.

The product of the process above described is a fiber-reinforced ceramic matrix composite article of novel structure. As conventional, it includes multiple inorganic reinforcing fibers disposed within the ceramic matrix. However, in these composites, all or at least some of the reinforcing fibers are present within the matrix as members of identifiable fiber groups, which are groups of shortened parallel-aligned fibers produced by the fiber cutting or breaking process. Due to the nature of that process, each break through a group of long-staple fibers in the prepreg material produces two shortened-fiber groups, referred to as a group pair. In the preferred composites, the groups forming each pair, being referred to for reference as first and second shortened fiber groups, remain in axial juxtaposition with each other, i.e., the fiber ends in each group of the pair remain in relatively close proximity with each other. Further, depending on the shape of the final composite, the fiber ends immediately adjacent the break in the two fiber groups are frequently aligned in a common direction.

DETAILED DESCRIPTION

Figure 1:
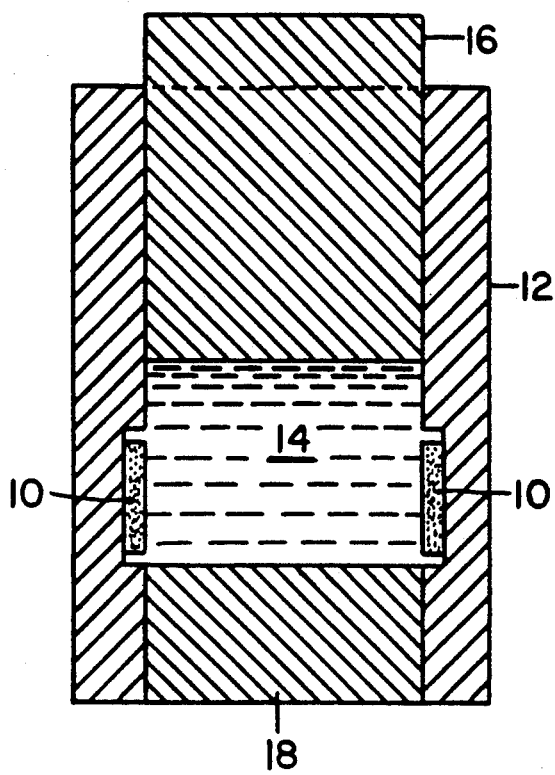
FIG. 1 of the drawing is a schematic illustration of apparatus useful for the consolidation of ceramic matrix composites in accordance with the invention.

As will be evident from the following description, the invention is not limited to the use of any particular ceramic matrix material, but instead may employ any of the ceramic materials employed for the manufacture of ceramic composites in the prior art. These include powdered glasses, such as powdered aluminosilicate glasses or powdered borosilicate glasses, as well as powdered aluminosilicate glasses which are thermally crystallizable to yield refractory glass-ceramic matrices, including $\beta$-spodumene, anorthite, cordierite, or other glass-ceramics. Conventional crystalline ceramics such as alumina, zirconia, silicon carbide, silicon nitride, or the like may also be used.

Likewise, there is no restriction to the use of particular reinforcing fibers; any of a variety of fibers having known utility for ceramic matrix reinforcement, including fibers of carbon, silicon carbide, glass, silicon nitride, alumina, mullite or similar materials, may be used. The physical form of the fibers is likewise not critical, although at present fiber tows are strongly preferred for the fabrication of prepreg tow or tape.

Flexible binders are needed to bind the selected fibers and ceramic matrix materials together in the form a prepreg which can be reshaped, and good results are obtained using binders which are thermoplastic solids. These provide prepreg material which can be reshaped by heating, if necessary repeatedly, without binder burnout.

A number of different binder formulations can be used, but the preferred formulations are thermoplastic binders comprising a mixture of one or more thermoplastic polymers and one or more low-melting waxes. A particularly preferred thermoplastic binder is hereinafter described; other such binders are disclosed in copending, commonly assigned U.S. patent application Ser. No. 07/358,571 filed May 30, 1989 by R. E. Johnson et al., which is expressly incorporated herein by reference and which may be referred to for a further description of thermoplastic binders.

Illustrative of the preferred thermoplastic binders are binder formulations comprising 10–40% by weight of thermoplastic polymers, e.g., one or more of ultra-high molecular weight polyethylene, acrylic or polyethylene/acrylic copolymers, and styrene tri-block copolymer elastomers. The wax component suitably comprises 35–90% by weight of the binder and includes one or more fatty acid, fatty glyceride or, preferably, fatty alcohol waxes which are room temperature solids and melt below 80° C.

The production of prepreg fiber tow for use as a starting material in the method of the invention follows conventional procedure for the impregnation or infiltration of fiber tow using liquid or liquifiable thermoplastic suspensions of powdered ceramic matrix materials. A selected continuous fiber tow or yarn, preferably pretreated to remove sizing and other foreign substances therefrom, is transported through the suspension or dispersion while the latter is maintained at low viscosity by heating. Infiltration of the tow occurs rapidly upon immersion, after which the tow is withdrawn, cooled, and collected. The resulting prepreg tow may then be processed directly to provide shortened-fiber prepreg tow, or it may be first incorporated into collimated prepreg tape, mat or cloth which can be so processed.

While the chopping of fiber tow or tape produced as described constitutes one useful method of fiber shortening, the production of elongated rather than chopped prepreg is preferred for certain preforms, e.g., closed cylindrical shapes such as rings or cylinders. In these cases, parallel fiber alignment in a single direction, such as the circumferential direction of the closed preform, may be preferred.

For achieving this type of alignment, prepreg tape, mat or tow comprising multiple parallel-aligned long-staple fibers is processed to provide multiple breaks in the long staple fibers, but without segmenting the prepreg. The fiber breaks, which are at multiple random or patterned points along the length of the prepreg, will effect the severance of some but not all of the fibers in the prepreg cross-section at each point of severance, so that the physical continuity of the elongated prepreg is preserved. The resulting prepreg can then be shaped into a preform with easy control over fiber orientation, since at any given locality within the preform, the largely parallel alignment of adjacent fibers, including adjacent segments of severed fibers, is retained.

Many of the advantages of the use of short-fiber prepreg in accordance with the invention can be understood from a consideration of the problems involved in the production of ceramic matrix composite ring structures. Certain of these products require high circumferential or hoop strength, i.e., high tensile strength in the curved axis or plane forming the ring circumference. A convenient fabrication approach for a such a product is simply to wrap prepreg tow or tape containing continuous parallel-aligned fibers around an expandable core member to form a cylindrical preform, and then to thermally consolidate the preform by expanding the core element to compress the prepreg winding against a rigid outer cylindrical mold element.

Apparatus suitable for the fabrication of such a composite structure is schematically illustrated in FIG. 1 of the drawing. FIG. 1 is a cross-sectional schematic elevational view of consolidation apparatus for consolidating a cylindrical preform wherein uniaxial piston pressure is converted to radially directed consolidation force by a hydrostatic pressure medium.

As shown in FIG. 1, the apparatus is configured to debulk and consolidate a porous ceramic matrix composite ring preform 10 which is positioned within a rigid cylindrical outer mold 12 and peripherally surrounding an expandable hydrostatic pressure element 14 situated in the mold cavity. Pressure applied to the pressure medium 14 by upper plunger 16, and contained by bottom plug 18 forces medium 14 to expand against preform 10 and thus compresses preform 10 against the rigid walls of cylindrical mold 12. This action effects consolidation of the preform outwardly toward the mold wall.

Figures 2A, 2B:
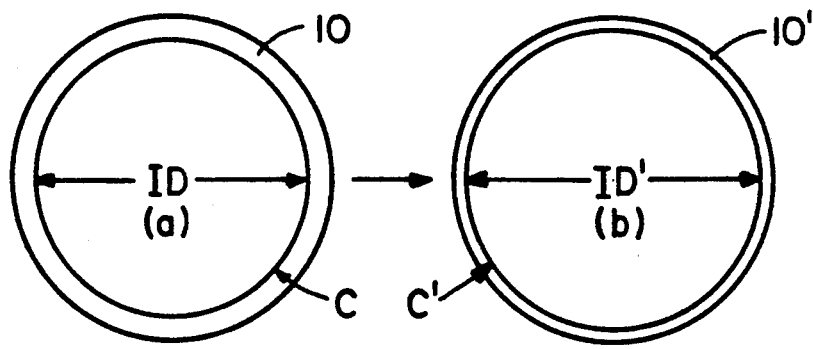
FIG. 2 is a schematic plan diagram illustrating the effects of consolidation on the physical dimensions of a three-dimensional ceramic composite article.

The effect of such a consolidation process on the geometry of the ring preform is significant. FIG. 2 of the drawing is a schematic top view in cross-section of a cylindrical ring such as ring 10 of FIG. 1, before and after consolidation. In FIG. 2(a), corresponding to the pre-consolidation diagram, ring 10 has initial dimensions which include an inner diameter designated ID and an initial inner circumference C. In the post-consolidation diagram of FIG. 2(b), wherein the ring is designated 10', the inner diameter has expanded to ID' and the inner circumference of the ring has been substantially extended to C'.

The effect of such expansions on reinforcing fibers lying parallel with the ring circumference can be better appreciated by considering an actual example, such as the example of a casing cylinder preform having an outer diameter of about 2.5 inches (6.4 cm) and a cylinder wall thickness of about 0.05 inches (0.13 cm). As previously suggested, the preform for such a ring would be about 60–80% void after binder burnout, and would require debulking by a volume factor of 3–5 during the consolidation process.

The original inner diameter of the porous ring preform would be about 2.125 inches (5.4 cm). Assuming a debulking factor of about 3.5, the inner diameter of the ring would have to expand to about 2.4 inches (6.1 cm) during consolidation. Accordingly the circumference of the inner wall would have to increase from 6.68 inches (17 cm) to about 7.54 inches (19.2 cm), an increase of 12.8%.

Based on this increase, any continuous fiber positioned on the inner circumference of the cylinder would undergo a strain of 12.8% during consolidation. However, a typical ceramic reinforcing fiber such as Nicalon ® silicon carbide fiber has a strain-to-failure value of only about 1.5%, which means that full consolidation of the ring would force the breakage of many of the circumferential reinforcing fibers needed for high ring strength.

Figure 3:
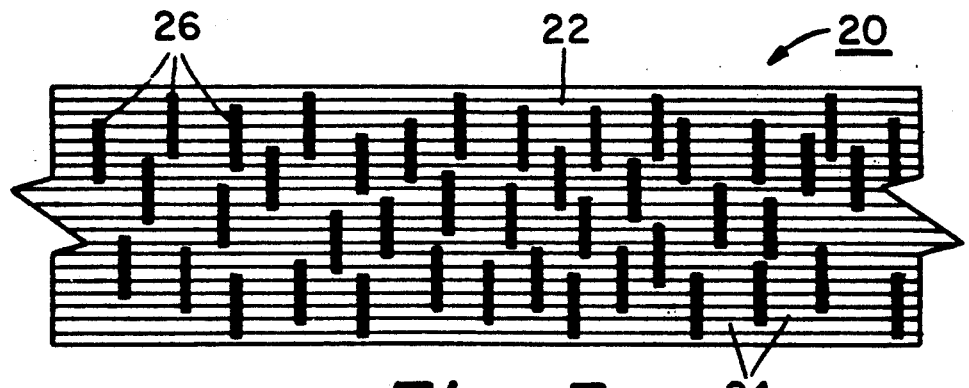
FIG. 3 schematically illustrates a form of continuous shortened-fiber prepreg useful in the process of the invention.

This potential breakage problem may be substantially alleviated by using a shortened-fiber prepreg material to form the cylindrical preform for the cylinder ring. A useful form of such a prepreg is shown in FIG. 3 of the drawing. FIG. 3 is a schematic cross-sectional plan view of a shortened-fiber prepreg tape 20 comprising a matrix material 22 composed of ceramic powder and a polymeric binder in which reinforcing fibers 24 are disposed.

Tape 20, which may be made in conventional fashion, is treated to selectively shorten reinforcing fibers 24 therein by repeatedly piercing the tape, e.g. with a metal blade, to form a number of elongated perforations 26 therethrough. The perforations, which may be random or according to a preselected pattern, form breaks in the fibers 24, reducing the average fiber length in the prepreg tape and thereby rendering it more easily consolidated in directions parallel to the reinforcing fibers therein.

Prepreg fiber tow or yarn can be similarly treated to introduce random or patterned fiber breaks without completely severing the prepreg tow or yarn at any point. In this way the original fiber-parallel structure of the prepreg tow or tape may be retained, and the tow or tape may be aligned in any desired direction in a preform for a composite product to dictate a strong axis or plane for that product.

The use of perforated tape or similar fiber-shortened prepreg material provides a ceramic matrix composite product with a particularly desirable structure. Referring again to FIG. 3, each tape perforation 26 produces two shortened fiber groups (one on each side of the perforation), comprising parallel-aligned fibers, these groups being referred to as a group pair. In the prepreg, and most typically in the final composite product resulting from prepreg consolidation, the fiber ends adjacent each break 26 remain in axial juxtaposition with each other. Thus, notwithstanding locational shifts due to fiber redistribution during consolidation, the fiber groups in each group pair remain largely in end-to-end (but typically non-contacting) alignment, and with proximate fiber ends substantially parallel with each other at least along fiber segments immediately adjacent each break. Thus the fiber alignment pattern introduced into a composite preform using the continuous shortened fiber prepreg is preserved.

Prepreg tape suitable for use as a starting material in the process of the invention can be made by known methods. A preferred tape is made from a commercially available silicon carbide fiber tow, Nicalon ® NLM-202 silicon carbide fiber tow, commercially available from the Nippon Carbon Company of Tokyo, Japan. This tow is first desized by passing it through a tube furnace, and is then transported though a suspension of glass powder in thermoplastic binder to thoroughly impregnate the tow with the suspension.

The suspension used is prepared by mixing powdered glass with the thermoplastic binder or vehicle in a proportion of 50% glass and the remainder vehicle by weight. The glass is a calcium aluminosilicate glass having an average particle size of about 10 microns which is thermally crystallizable on appropriate heat treatment to yield an anorthite glass-ceramic.

The thermoplastic vehicle used is composed of about 60 parts by weight of a fatty alcohol wax (Alfol TM 1418 DDB fatty alcohol wax blend, commercially available from the Vista Chemical Company of Houston, Tex.), about 20 parts by weight of a styrene-ethylene-/butylene-styrene thermoplastic tri-block copolymer (Kraton TM G1650 thermoplastic elastomer, commercially available from the Shell Chemical Company of Houston, Tex.), about 20 parts by weight of a polybutene resin plasticizer (Parapol 950 oil additive, commercially available from Exxon Chemicals of Houston, Tex.), and about 0.4 parts by weight of a dispersant (Hypermer KD3 dispersing agent, commercially available from ICI Americas of Wilmington, Del.). The vehicle first is prepared by blending all components except the dispersant and block copolymer together at 140° C., and then adding the copolymer with heating to about 167° C., with thorough mixing until a homogeneous blend is obtained.

Thorough dispersion of the powdered glass in the vehicle is achieved by first dispersing the glass in an organic liquid carrier (toluene) containing the dispersant, and then mixing the dispersed glass and carrier with the vehicle in a heated planetary mixer at about 140° C. to drive off the carrier and complete the mixing process. The resulting thermoplastic dispersion is fluid at 140° C. but solidifies on cooling to about 100° C. It is used to impregnate the silicon carbide fiber tow by transporting the tow though the fluidized dispersion at a transport rate of about 10 ft/min. Following transport through the dispersion, the tow is removed, cooled, and collected as prepreg fiber tow on a spool.

The prepreg tow thus provided is next formed into a multi-tow prepreg tape by a collimation process. Sixteen spools of the prepreg fiber tow are placed on a creel and the yarn ends from the spools are collected and pulled at a transport rate of about 4 ft/min through combs to provide parallel tow alignment. The collimated tows, in contact with each other, are then sandwiched between two sheets of release paper and the sandwiched array is brought into contact with a heating platen maintained at about 120° C. to soften the thermoplastic binder. Thereafter, the softened tows are drawn between successive squeeze rollers and pinch rollers to fuse the tows and set the tape thickness, and then contacted with a chill plate operating at about 7° C. to set the binder and tape dimensions. The tape produced by this process has a width of about 1.75 inches (4.5 cm) and a thickness of about 0.010 inches (0.03 cm).

The preparation of a continuous shortened-fiber prepreg from collimated tape such as described, and the use of such prepreg for the fabrication of a ceramic matrix composite ring of high density and good circumferential strength, are illustrated by the following example.

EXAMPLE 1

A shortened-fiber prepreg tape is made from collimated tape by a tape perforation technique. The tape which is selected, comprising a calcium aluminosilicate glass matrix powder and parallel aligned silicon carbide fiber tow reinforcement, has a width of about 2 inches (5 cm). This tape is first laid flat on a bench, and then a narrow chisel is used to form perforations through the thickness of the tape at random points across the width and along the length thereof. The appearance of the tape after piercing is substantially as shown in FIG. 3 of the drawing; the effect is that the average fiber length in the tape is reduced from a value on the order of 1 meter to a on the order of four inches (10 cm).

The shortened-fiber prepreg tape thus provided is next heated to soften the thermoplastic binder, and is wrapped length-wise around a solid cylindrical mandrel approximately 10 cm in diameter to form a cylindrical preform for a composite ring. The preform has a wall thickness of about 0.2 inches (0.5 cm) and a ring height of about 2 inches (5 cm). The mandrel is composed of a fused mixture of glass and a flake graphite filler, the glass constituting about 20% by weight and the graphite filler the remainder of the mandrel material.

The mandrel and preform are next placed within a cylindrical mold cavity in a consolidation mold assembly such as shown in FIG. 1 of the drawing. The preform is positioned as ring 10 on a mandrel (14) in a graphite sleeve (12) situated on a bottom plunger (18). The ring, mandrel and plunger are then preliminarily heated to a temperature of about 550° C. for a time of about four hours to remove the thermoplastic binder from the preform.

After removal of the binder, a top plunger (16) is placed over the mandrel, the entire assembly is positioned under a hydraulic ram in a hot-pressing furnace, and is heated to an initial consolidation temperature of about 850° C. which is above the flow point of the glass in the mandrel. During the latter stages of this heating, pressure is gradually applied to glass/graphite mandrel (14) via the hydraulic ram to achieve a final pressure of 2500 psi against the preform.

Heating of the mold assembly under pressure is continued until a peak temperature of about 1340° C. is reached. This application of heat and pressure completes the consolidation and crystallization process. Finally the pressure is released, the mold assembly is allowed to cool and is removed from the press, and the consolidated composite ring is removed from the molding assembly and examined.

The product of the Example is a fully densified composite cylinder ring comprising circumferentially oriented reinforcing fibers. The ring exhibits both high density and high circumferential or hoop strength. Although fiber discontinuities in the form of broken fibers are present within the glass-ceramic matrix, particularly in sections of the ring near the inner circumferential surface thereof, the location and extent of breakage are controlled, due to the preliminary use of selective prepreg tape perforation. Thus complete consolidation is achieved without the appearance of catastrophic tears or cracks in the inner ring wall, which can often result if shortened-fiber prepreg is not used.

The method utilized for the fabrication of the ring structure of the above Example can be extended to the production of products of other configurations, and in general the properties of those products will compare very favorably with those of prepreg material containing only long-staple fibers. In one test, for example, sample bars cut from each of two flat composite plates, one comprising long-staple fibers and the other shortened fibers of the same composition, were compared for strength and elasticity. Both samples comprised uniaxially oriented silicon carbide reinforcing fibers in a highly crystalline anorthite glass-ceramic matrix.

The data resulting from this test, including the microcrack yield (MCY) stress and strain levels and the ultimate or failure (ULT) stress and strain levels for each of the samples, are reported below in Table 1.

TABLE 1

| | Composite Tensile Properties | | | |
|---|---|---|---|---|
| Composite Sample Type | MCY Stress (KSI) | MCY Strain (%) | ULT Stress (KSI) | ULT Strain (%) |
| Shortened Fiber Prepreg | 25.8 | 0.13 | 57.2 | 0.38 |
| Standard (Long Fiber) Prepreg | 29.0 | 0.16 | 64.5 | 0.96 |

As is evident from a review of the data in Table 1, while not exhibiting the strength and high strain to failure of the composite material with long staple fibers, the shortened-fiber product exhibits very desirable strength and strain to failure characteristics. Yet the latter material is significantly more resistant to consolidation breakage and/or to incomplete consolidation than is the former material.

Of course, the random tape perforations illustrated in Example 1 are simply one way of shortening the fibers in the prepreg to improve debulking and consolidation behavior. More systematic breaking patterns and/or patterns wherein larger or smaller numbers of fibers are weakened or broken in the process of preparing shortened-fiber prepreg may alternatively be employed.

As previously disclosed, an alternative form of shortened fiber prepreg which is useful for ceramic composite production in accordance with the invention is that of discontinuous or chopped fiber prepreg. This form of prepreg also involves the processing of long fiber prepreg to shorten the reinforcing fibers therein. In this case, however, the prepreg itself is shortened or cut to provide prepreg pellets, short ribbons or flakes.

The method for cutting the prepreg is not critical, and may be carried out manually, as by shearing or chopping, or by automated cutting apparatus. One form of apparatus which is particularly useful for the rapid production of prepreg flakes is shown in FIG. 4 of the drawing.

Figure 4:
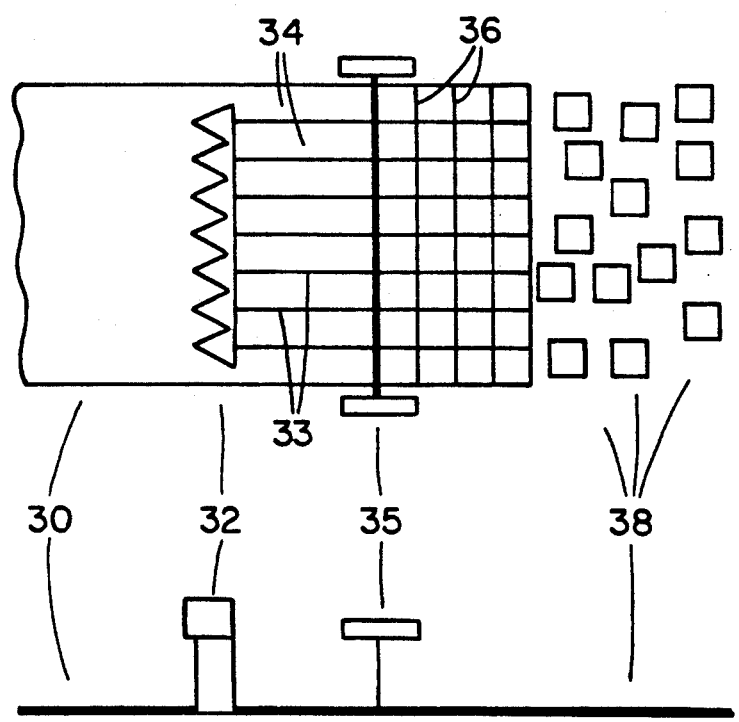
FIG. 4 schematically illustrates apparatus for the production of discontinuous shortened-fiber prepreg in accordance with the invention.

As shown in FIG. 4, a schematic illustration of automated cutting apparatus in juxtaposed plan and elevational views, prepreg tape 30 as prepared in accordance with the above-described procedure is transported first past an array of cutting blades 32. Cutting blades 32 are positioned to intercept the tape, thus to form an array of parallel slits 33 in the tape width thereby converting the tape to an array of parallel ribbons 34 formed of the prepreg material.

After traversing cutting blades 32, the tape passes beneath chopping blade 35 which is periodically driven through the continuous prepreg ribbons passing thereunder. The series of cuts 36 formed by chopping blade 35 section the tape further so that it may be broken into a multiplicity of small prepreg "flakes" 38.

Flakes such as flakes 38 readily separate from each other and may be randomly redistributed as needed during any subsequent reforming operation. However, as is apparent, the fiber alignment in each flake is uniaxial and all of the fibers are aligned within and parallel to the plane of the tape. Thus the flakes are particularly useful for the formation of rigid flat or curved planar products. In these products, fiber alignment is within and parallel to the plane of the formed surface, but randomly oriented in that plane. Thus they impart a high degree of planar stiffness and strength to the composite product.

Figure 5:
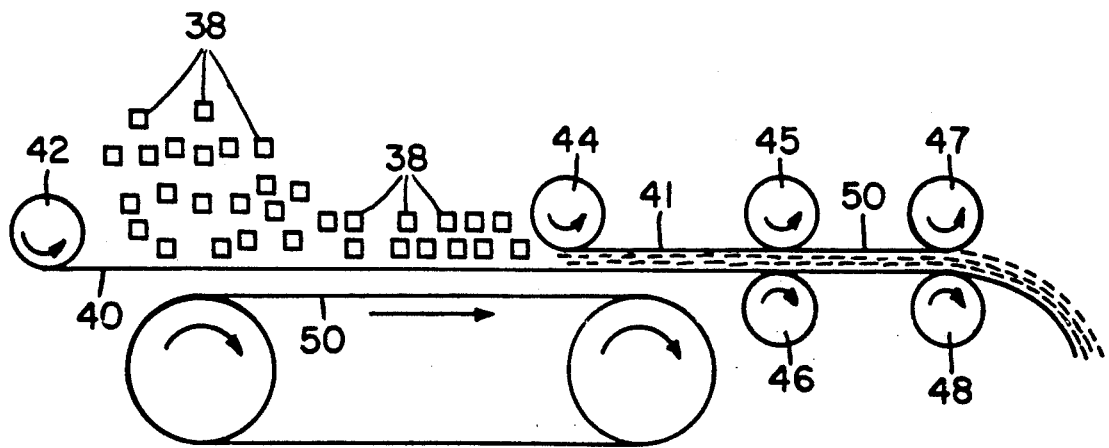
FIG. 5 schematically illustrates apparatus for the production of shortened-fiber prepreg in accordance with the invention.

Apparatus suitable for reforming prepreg flakes, particularly prepreg flakes such as flakes 38 comprising a thermoplastic binder, is schematically illustrated in FIG. 5 of the drawing. As shown in FIG. 5, flakes 38 may be randomly deposited on a substrate such as a release paper 40 fed from a roller 42. Support for paper 40 is provided by moving belt support 50 which has a traverse speed matching that of release paper 40 in the direction of the arrow shown below the surface of belt 50.

As the flakes are deposited on release paper 40, a covering sheet of release paper 41 is fed from roller 44 such that a sandwich or laminate of the flakes between opposing release papers 40 and 44 is provided. The resulting assembly of prepreg flakes and covering release papers is then heated and fed through pinch rollers 45-46 which operate to compress the flakes into a continuous prepreg sheet, align the fibers in the plane of the sheet, and set the desired thickness in the sheet.

After the sheet has been formed, it may be cooled and the top release paper stripped and collected on roller 47. The reformed sheet prepreg product is then transported out of the apparatus over roller 48.

The thickness of the prepreg sheet formed by this process can be varied in accordance with the quantity of flake material deposited on the release paper and by the gap between the pinch rollers. The fibers in the tape are generally well aligned with the plane of the tape, although randomly oriented in that plane. Advantageously, the process permits the degree of realignment of the fibers to be varied somewhat as the speed of traverse of the heated flake material through the pinch rollers. Higher traverse rates result in a more highly aligned fiber phase than do lower traverse rates. Thus the ultimate properties of the composite product formed from shortened-fiber prepreg sheet produced as described are subject to better control than are those of products made by conventional chopped tow methods.

While the invention has been particularly described above with respect to specific materials and specific procedures, it will be recognized that those materials and procedures are presented for purposes of illustration only and are not intended to be limiting. Thus numerous modifications and variations upon the compositions and processes specifically described herein may be resorted to by those skilled in the art within the scope of the appended claims.

We claim:

1. A method for making a ceramic matrix composite article comprising the steps of:
   forming an elongated prepreg comprising a powder of a ceramic matrix material, an organic binder, and multiple parallel-aligned, long-staple inorganic reinforcing fibers;
   forming multiple breaks in at least some of the long-staple fibers at multiple break points along the length of the prepreg, each break effecting severance of less than all of the fibers in a cross-section of the prepreg at the break point, thus to provide an elongated shortened-fiber prepreg material;
   shaping the shortened fiber prepreg material into a preform shape; and
   debindering and consolidating the preform shape to provide a dense ceramic matrix composite.

2. A method in accordance with claim 1 wherein the organic binder is a thermoplastic organic binder.

3. A method in accordance with claim 2 wherein the elongated prepreg is a prepreg fiber tow or fiber tape.

4. A method in accordance with claim 2 wherein the average fiber length in the shortened fiber prepreg is below 15 cm.

5. A method in accordance with claim 1 wherein the shortened fiber prepreg is a single prepreg tow.

6. A method in accordance with claim 1 wherein the shortened fiber prepreg is a prepreg tape or mat comprising multiple parallel-aligned fibers.

7. A method in accordance with claim 1 wherein the preform shape is a cylindrical shape.

8. A ceramic matrix composite article comprising a ceramic matrix reinforced with inorganic reinforcing fibers, wherein at least some of the reinforcing fibers comprise groups of shortened, parallel-aligned fibers within the matrix, each group comprising a member of a group pair consisting of first and second shortened fiber groups, the first fiber group in each pair being disposed in axial juxtaposition with the second fiber group.

9. A ceramic matrix composite article in accordance with claim 8 wherein the ceramic matrix is selected from the group consisting of glasses, glass-ceramics and ceramics.

10. A ceramic matrix composite article in accordance with claim 9 wherein the inorganic reinforcing fibers are selected from the group consisting of silicon carbide, silicon oxycarbide, mullite and graphite fibers.

11. A ceramic matrix composite article in accordance with claim 10 wherein the inorganic reinforcing fibers are silicon carbide or silicon oxycarbide fibers.

12. A ceramic matrix composite article in accordance with claim 9 which is in the form of a cylindrical shape.

* * * * *